J. L. SIMPSON.
SUGAR DISPENSER.
APPLICATION FILED FEB. 17, 1917.
1,349,228.
Patented Aug. 10, 1920.
2 SHEETS—SHEET 2.
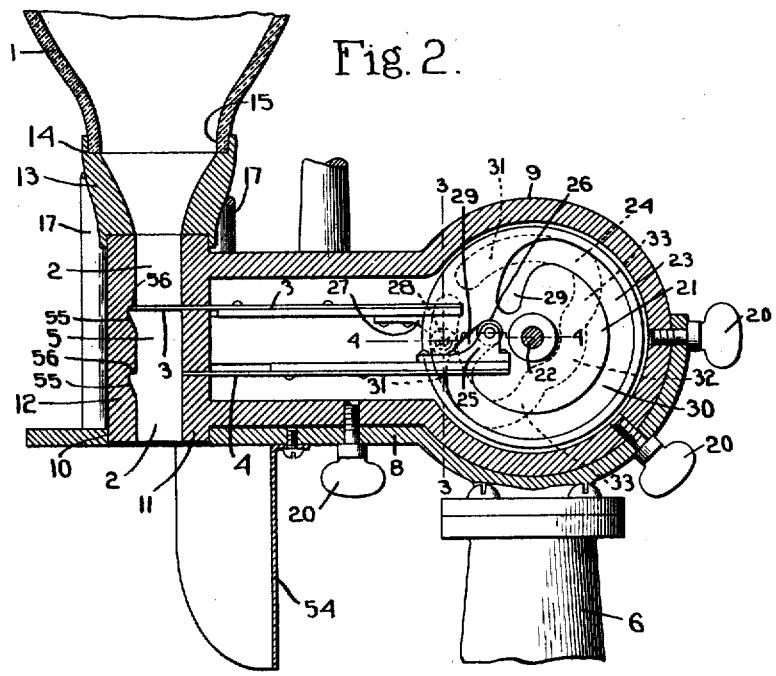
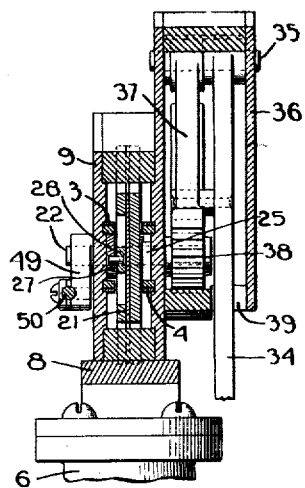
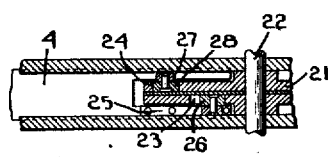
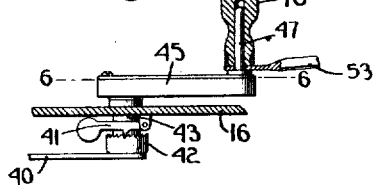
Inventor.
Judson L. Simpson
by Heard Smith & Tennant.
Attys.

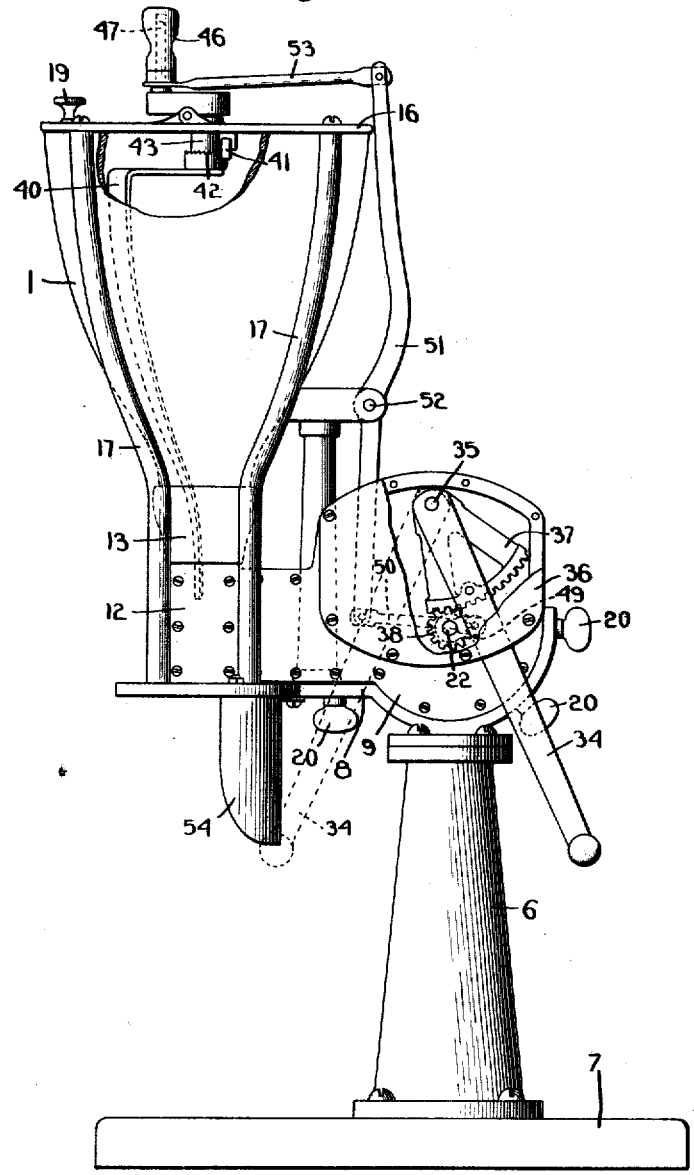

UNITED STATES PATENT OFFICE.

JUDSON L. SIMPSON, OF KENNEBUNK, MAINE, ASSIGNOR OF ONE-HALF TO ASA A. WHEELER, OF SOMERVILLE, MASSACHUSETTS.

SUGAR-DISPENSER.

1,349,228.    Specification of Letters Patent.    Patented Aug. 10, 1920.

Application filed February 17, 1917. Serial No. 149,340.

*To all whom it may concern:*

Be it known that I, JUDSON L. SIMPSON, a citizen of the United States, residing at Kennebunk, county of York, State of Maine, have invented an Improvement in Sugar-Dispensers, of which the following description, in connection with the accompanying drawing, is a specification, like characters on the drawing representing like parts.

This invention relates to dispensing apparatus which is designed to dispense measured quantities of sugar or other granular or powdered material, and has for its object to provide a novel dispenser which is inexpensive to manufacture, which is sanitary in its use, which is easy to operate, and which has other advantages which will be more fully hereinafter set forth.

In order to give an understanding of the invention, I have illustrated in the drawings a selected embodiment thereof which will now be described, after which the novel features will be pointed out in the appended claims.

In the drawings, Figure 1 is a side view of a dispensing apparatus embodying my invention;

Fig. 2 is a sectional view through the discharge passage and the slides controlling the same;

Fig. 3 is a section on the line 3—3, Fig. 2;

Fig. 4 is a section on the line 4—4, Fig. 2;

Fig. 5 is a view of the ratchet mechanism for operating the stirrer or agitator;

Fig. 6 is a section on the line 6—6, Fig. 5.

My improved dispenser is of that known type which comprises a container for the material to be dispensed, which container has a discharge passage, two slides situated at different points along said passage and forming between them a measuring chamber, and means for actuating said slides so as to open the upper slide and allow material from the container to pass into the measuring chamber, and then to close said slide and open the under slide so as to allow the material in the chamber to be discharged. The container containing the sugar or other granular material is shown at 1, and it will preferably be made of glass so that the contents thereof can be seen. This container is provided with a discharge passage 2 communicating with the lower end thereof and through which the material is to be discharged. The slides for controlling the discharge passage are indicated at 3 and 4, respectively, said slides operating through one wall of the discharge passage, and each being constructed to be moved across the discharge passage to close the latter. These slides are situated at different points along the discharge passage, thus providing a space 5 between them which constitutes the measuring chamber. The mechanism for operating the slides is contained in a suitable casing 9.

The container 1, the slides 3, 4 and the operating mechanism therefor are all mounted on a suitable stand or support 6 which is provided with a base 7 that extends out under the discharge passage 2 and is of sufficient size to permit a cup or other receptacle to be placed thereunder in position to receive the contents delivered from the passage 2. The stand 6 is shown as having a head portion 8 to which are detachably secured the container 1 and the casing 9 inclosing the operating mechanism for the slides 3 and 4.

The discharge passage 2 is shown as formed in a part 12 integral with the casing 9, said part 12 having a boss 11 depending from its lower end which is received in an aperture 10 formed in the head 8, said boss and aperture serving thus to properly position the parts. Mounted on the upper end of the part 12 is a tubular spacing member 13 which is rabbeted at its upper edge, as at 14, to receive the lower edge 15 of the container 1 which is open at the bottom. The part 13 thus forms a continuation between the container and the discharge passage 2. Resting on the top of the container is a plate 16 which is connected to the head 8 by tie-rods 17, said tie-rods and plate thus operating to clamp the container firmly against the intermediate section 13 and to tie firmly together the container and the part 12 in which the discharge passage is formed. The plate 16 has a cover section hinged thereto, said section being provided with a knob 19 so as to permit it to be opened in order to deliver material to the container.

The casing 9 is detachably secured to the head 8 by means of clamping screws 20, thus providing for readily detaching the head when it is necessary to clean or repair any of the parts.

The slides 3 and 4 operate in and are guided by grooves formed in the casing 9, and they are actuated by a suitable cam 21 which is fast on a shaft 22 journaled in the casing 9. This cam is an oscillatory cam and is so constructed that when it is at the end of its movement in either direction the upper slide 3 will be closed and the lower slide 4 will be withdrawn or open, as shown in Fig. 2. Said cam is also so constructed that during the first part of the movement thereof in either direction, the lower slide 4 will first be closed and then the slide 3 will be opened, thus permitting some of the material in the container to fill the measuring chamber 5, and during the last part of the movement in either direction the upper slide 3 will be closed and then the lower slide 4 will be opened, thus allowing the measured charge to be delivered from the discharge passage 2. The cam 21 herein shown is in the form of a disk which has a cam groove cut in each face thereof, one of the cam grooves being indicated at 23 and the other at 24. The cam groove 23 is that which operates the lower slide 4 and the cam groove 24 is that which operates the upper slide 3. The slide 4 is provided at its end with an extension 25 which overlies the side of the cam disk 21, and this extension 25 has a roll 26 extending laterally therefrom which is received in the cam groove 23. Similarly, the upper slide 3 has an extension 27 overlying the opposite face of the cam disk 21 and provided with a laterally-extending roll 28 which is received in the cam groove 24.

The cam groove 23 is provided at each end with the eccentric portion 29, and intermediate of its ends with the concentric portion 30. The cam groove 24 is provided at each end with the concentric portion 31 and at its central part with the concentric portion 32 which is formed on a smaller radius than the portion 31. Between the portions 32 and 31 are the eccentric portions 33. When the cam disk 21 is at the limit of its movement in either direction, the roll 26 on the slide 4 will be at the inner end of the eccentric portion 29 of the cam groove 23 and will thus be retracted, as shown in Fig. 2, while the roll 28 will be at the end of the concentric portion 31 of the groove 24 and the slide 3 will be projected. When the cam turns clockwise, Fig. 2, from the position shown therein, the initial turning movement will cause the roll 26 to traverse the eccentric portion 29 of the cam groove 23 and will thus project the slide 4 across the discharge passage 2. During this time the roll 28 is following the concentric portion 31 of the groove 24 so that the upper slide 3 remains stationary. By the time the slide 4 has been completely projected, the roll 26 has been carried into the concentric portion 30 of the cam groove 24 and the slide 4 will remain projected while the roll 26 is in said concentric portion. Immediately after the lower slide 4 has been thus projected across the discharge passage 2, the roll 28 on the upper slide passes into the eccentric portion 33 of the cam groove 24, thus causing said slide 3 to be retracted. The upper slide will remain retracted while the roll 28 is passing through the concentric portion 32 of the cam groove 24, and this gives ample time for the chamber 5 to become filled with material from the container 1. As the roll 28 passes from the concentric portion 32 to the eccentric portion 33 at the opposite end of the cam groove 24, the upper slide 3 is projected to close the discharge passage, as shown in Fig. 2, and when said slide has thus been projected, then the roll 26 on the lower slide 4 will pass into the eccentric portion 29 of the opposite end of the cam groove 23, thus retracting said lower slide. This completes one cycle of operations and will result in delivering from the discharge passage 2 a measured quantity of material.

The turning movement of the cam 21 in the opposite direction will duplicate this cycle of operations and will bring the parts back into the position shown in Fig. 2. With my improved device, therefore, a forward turning movement of the cam 21 through slightly less than one revolution will result in delivering a measured quantity of material from the container, and a turning movement of the cam in the opposite direction will result in delivering another measured quantity from the container.

While any suitable means may be provided for oscillating the cam 21, I have shown herein an operating handle which is so connected to the cam that the movement of the cam in one direction will give the cam its oscillatory movement in one direction, while the movement of the handle in the opposite direction will give said cam its oscillatory movement in the opposite direction. The operating handle is shown at 34 and the upper end thereof extends into the portion 36 of the casing 9 and is pivoted therein at 35. Rigid with the handle 34 is a segmental gear 37 which meshes with a pinion 38 on the cam shaft 22. The lever 34 operates in a slot 39 formed in the portion 36 of the casing, said slot operating as a means to limit the swinging movement of the lever. The gearing 37, 38 is so proportioned that the swinging movement of the lever 34 in one direction will give the cam 21 its complete oscillatory movement in one direction, and, therefore, the operation of delivering a measured charge from the container 1 involves merely swinging the handle 34 from the full to the dotted line position, Fig. 1, or vice versa.

When the material which is to be delivered is such that it tends to cake or to become sticky when subjected to heat or moisture, it is desirable to provide some means for stirring or agitating the material in the container 1. I have herein provided a stirrer or agitator which is operated automatically from the cam shaft 22 so that at each operation of the cam shaft, the stirrer will be given a movement. The stirrer herein shown is in the form of a stirring blade 40 which is carried by a stud 43 pivotally mounted in the plate 16. The upper end of this stud projects through the plate 16 and it has pivotally mounted thereon an arm 45 from the end of which projects a pin 47 on which is removably received a handle 46. The arm 45 is made hollow and situated within said arm is a ratchet wheel 44 which is fast on the stud 43. The arm 45 has a spring-pressed pawl 48 pivotally mounted therein which engages the ratchet 44. The stud 43 has the ratchet teeth 42 formed thereon beneath the plate 16, and these ratchet teeth are engaged by a stop pawl 41 pivoted to the plate 16.

When the arm 45 is turned in one direction, the stud 43 with the stirrer 40 will be turned with the arm because of the engagement of the pawl 48 with the ratchet wheel 44. When the arm is turned in the opposite direction, the stud will be prevented from return movement by the stop pawl 41 and the pawl 48 in the arm 45 will click over the ratchet 44.

The cam shaft 22 is provided with a crank arm 49 which is connected by a link 50 with the lower end of a lever 51 pivoted at 52. The upper end of this lever is connected by a link 53 with the stud 47. As a result, the oscillating movement of the lever 51 due to the oscillation of the cam shaft 22 will operate the stirrer 40 and thus keep the contents of the container in a free-flowing condition. The connection between the link 53 and the arm 45 is a detachable one so that whenever desired said link can be detached from the arm and the stirrer may be operated by hand. The end of the link 53 is provided with an aperture through which the pin 47 extends and since the handle 46 is removably sustained on the pin 47, the link 53 can be readily detached from the pin by merely removing the handle 46 and then lifting the end of the link off from said pin.

The head 8 is provided with a depending positioning flange 54 which serves to properly position a cup, mug or other receptacle into which one or more measured charges of material are to be delivered.

55 indicate notches formed in the wall of the discharge passage 2 opposite the ends of the slides 3 and 4. Each notch has a straight upper face 56 and a tapering side face. The slides 3 and 4 are of such a length that when they are fully projected, the ends thereof will just pass under the faces 56. There will, therefore, be a shearing action between the ends of the slides and the shoulders 56 each time that the slides are projected and this action, together with the shape of the notches will prevent the accumulation of any material at the ends of the slides which would prevent the slides from being completely projected.

I claim:

1. In a device for dispensing powdered or granular material of the type comprising a container having a discharge passage and two slides situated at different points along said passage and forming between them a measuring chamber, the combination with a casing or housing having said discharge passage formed therein and also being formed with a chamber in which said slides are received and which is provided on opposite sides with grooves in which said slides are guided, each slide having a forked end, a cam operating in the forked ends of said slides and provided with a cam groove on each face, the upper slide having an extension depending from one arm of the forked end and operating in one of said grooves and the lower slide having an extension rising from one arm and provided with an extension operating in the other groove.

2. In a device for dispensing powdered or granular material of the type comprising a container having a discharge passage and two slides situated at different points along said passage and forming between them a measuring chamber, the combination with a casing or housing having said discharge passage formed therein and also provided with two chambers, one of which contains guides for the slides, of an actuating cam situated in said chamber and operatively connected to said slides, an oscillatory handle pivoted in the other chamber and extending through the wall thereof, a pinion connected to said cam, and a segmental gear rigid with said handle and situated in said latter chamber.

3. In a dispenser of the type having a container provided with a discharge passage and two slides situated at different points along said passage and forming between them a measuring chamber, a cam connected to said slides, a shaft on which said cam is mounted, a crank connected to said shaft, a lever pivotally connected to said crank, a pivotally-mounted stirrer situated within said container, a connection between said lever and said stirrer, and means to turn said shaft.

4. In a dispenser of the type comprising a container having a discharge passage and two slides situated at different points along said passage and forming between them a measuring chamber, the combination with a cam connected to said slides, of a shaft on which said cam is mounted, a crank arm fast to said shaft, a lever connected to said crank arm, a stirrer pivotally mounted in the top of the container and having a crank arm connected thereto, a connection between said lever and said latter crank arm, and means to actuate said shaft.

5. In a dispenser, the combination with a container having a discharge passage, of two slides situated at different points along said passage and forming between them a measuring chamber, a cam for actuating said slides alternately to effect the discharge of measured quantities of material from said container, a stirrer depending into the container from the top thereof, and means connecting said stirrer with said cam.

6. In a dispenser, the combination with a container, of means to deliver measured quantities of material therefrom, an actuator for operating said means, a stirrer pivoted to the top of the container, a crank handle connected to said stirrer by pawl-and-ratchet connection, and operative connections between said crank handle and said actuating means.

In testimony whereof, I have signed my name to this specification.

JUDSON L. SIMPSON.